Sept. 15, 1953 L. C. FETEN 2,652,451

OVERCOMING ELONGATION OF PULSES

Filed March 16, 1951 2 Sheets-Sheet 1

LEWIS C. FETEN,
INVENTOR.

HUEBNER, BEEHLER,
WORREL & HERZIG,
ATTORNEYS.

BY Warren T. Jessup

LEWIS C. FETEN,
INVENTOR.

HUEBNER, BEEHLER,
WORREL & HERZIG,
ATTORNEYS.
BY Warren T. Jessup

Patented Sept. 15, 1953

2,652,451

UNITED STATES PATENT OFFICE 2,652,451

OVERCOMING ELONGATION OF PULSES

Lewis C. Feten, Long Beach, Calif.

Application March 16, 1951, Serial No. 215,973

6 Claims. (Cl. 178—66)

This invention relates to overcoming elongation of pulses due to multipath phenomena in mark-space pulse transmission systems.

A common form of communication system, hereinafter called a mark-space pulse transmission system, consists in transmitting groups of pulses separated by spaces. For example, a transmission group might consist of three to five equal and consecutive time intervals, each time interval being occupied by either a mark or a space. The number of permutations possible with such a system permits the creation of a large number of symbols, each mark-space transmission group being representative of a particular symbol in accordance with same arbitrary code.

A common way of achieving this transmission is to employ a single transmitter whose carrier frequency is successively and alternatively shifted back and forth between two frequencies disposed fairly close together on the frequency spectrum. Such a system is called a frequency shift system; operation at one of the frequencies denotes a mark while operation at the other frequency denotes a space. There is thus being transmitted at all times, either a mark signal or a space signal, the absence of one categorically calling for the presence of the other.

At the receiving end, in such systems, means are provided for sensing and responding to the two types of pulses, mark or space. When the transmission is by electromagnetic radiation over a great distance, the transmitted signal has available a number of paths, the shortest being generally the great circle path between transmitter and receiver, and the longest being a reflected and re-reflected path moving through the ionosphere. The result is that a given pulse is elongated at the receiver, because when the pulse should terminate (with termination of the pulse as transmitted through the shorter path), energy is continuing to come over the longer paths. Thus, mark and space pulses overlap at the receiver, even though at the transmitter the termination of one was coincident with the beginning of the other.

This pulse elongation produces ambiguity in the sensing means at the receiver, inasmuch as it is torn between a mark signal and a space signal, both appearing simultaneously. As a consequence, there is an ambiguous demarcation line between mark and space pulses, with resulting possibility of error in the decoding mechanism which must respond to a particular mark-space pulse group.

The principal object of the instant invention is to eliminate such ambiguity through overlapping, by providing means for exactly re-creating the mark and space pulses as they were transmitted, in spite of pulse elongation due to multipath phenomena.

It is a further object of this invention to provide means for terminating one pulse, for example, a mark pulse, immediately upon starting of the next succeeding space pulse, in spite of a tendency of the mark pulse to continue by virtue of multipath phenomena.

The instant invention makes use of the fact that even though the pulses are elongated at the receiver through the multipath phenomenon, the leading edges of the pulses are spaced at the receiver with the same uniformity as at the transmitter. This is because the leading edge of the pulse occurs when the signal reaches the receiver over the shortest path and the shortest path is always the same in spite of the presence of multipaths.

In accordance with the instant invention there is added to the usual receiving means for receiving successive alternate mark and space pulses, differentiating means for producing in response to the pulses, sharp spikes at the start of each mark and each space pulse. The differentiating means preferably assumes the form of a pair of resistor-capacitor circuits, which differentiate the abrupt start and finish step functions of the respective pulses to produce a sharp spike in the well-known manner. This differentiation produces a spike at the finish as well as at the start of the pulse, start and finish spikes being of opposite polarity.

It is preferred in accordance with the instant invention to provide clipping means which eliminate the finish spikes and put out only start spikes. The clipper also serves to amplify the spikes.

A flip-flop circuit having two stable modes of operation and preferably having a pair of input terminals is provided. Start spikes from mark pulses are applied to one side or terminal of the flip-flop circuit while start spikes from space pulses are applied to the other terminal. The result is that the flip-flop circuit shifts abruptly from one mode of operation to the other in accordance with the start spikes only, being completely uninfluenced by the termination of a given mark or space pulse, as the case may be. In this manner elongation of the transmitted mark and space pulses has no influence whatever on the ultimate reaction of the flip-flop circuit, which in effect re-creates the mark and space pulses exactly as they were sent from the transmitter.

A conventional output means, for example, a polar relay, is connected to the output of the flip-flop circuit to respond to the re-created mark and space pulses, which, being completely unambiguous, produce a clear and definite reaction in the polar relay.

A preferred form of the instant invention will now be described with reference to the accompanying drawings, wherein.

Figure 3:
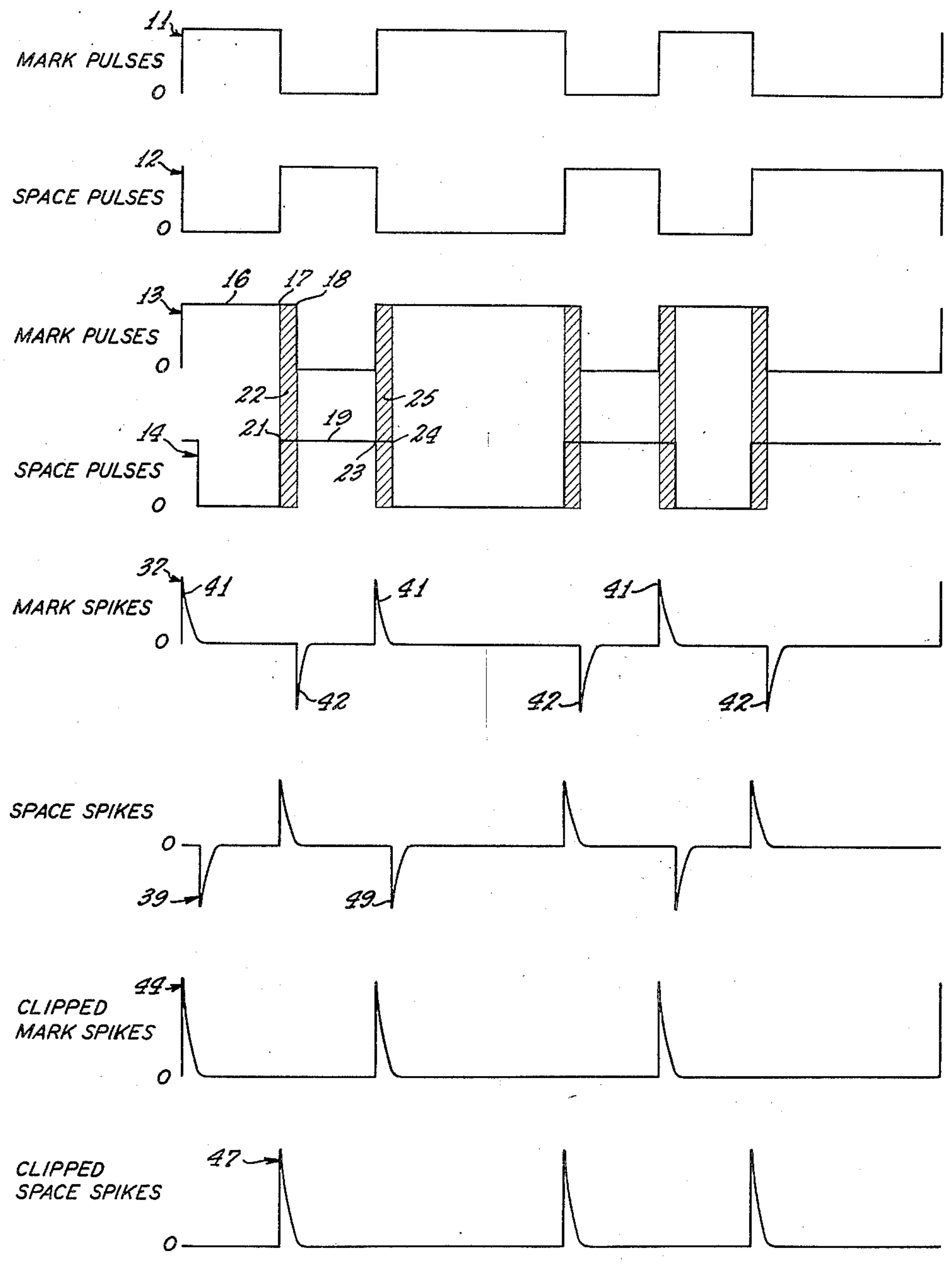

Fig. 3 consists of a series of wave forms useful in illustrating the instant invention.

In order to better understand the purpose of the instant invention, reference will first be made to Fig. 3 showing a wave form 11 representing a series of mark pulses as transmitted, and wave form 12 representing a series of space pulses as transmitted. It will be noted that the presence of a mark pulse categorically calls for the absence of a space pulse and vice versa. Thus, from the transmitter there is being transmitted at all times either a mark pulse or a space pulse, but never both together.

Under multipath conditions discussed hereinbefore, the pulses as received at the receiver are elongated and do not terminate when they should, because of the remaining energy continuing to be received from the longer transmission paths. This is illustrated by the wave form 13 representing received mark pulses and the wave form 14 representing received space pulses. It will be noted that the mark pulse 16 does not terminate at 17 as it should, but continues to 18 before terminating. In the meantime the space pulse 19 has appeared at the receiver as shown at 21, which is coincident with the point 17 in the wave form 13. The result is an overlapping time area 22, which creates an ambiguity in the receiver response means, in that the response means is torn between a tendency to flip to the space condition by virtue of the space pulse 19, and a tendency to remain in the mark position by virtue of the continuing mark pulse 16. The same difficulty occurs when the space pulse 19, which is supposed to terminate at 23, continues to 24 and creates the shaded area of ambiguity 25.

The manner in which the ambiguous response areas, e. g., 22 and 24, are eliminated in accordance with the instant invention, will now be described with reference to Fig. 1. Numeral 26 represents a receiver receiving both mark and space pulses through an antenna 27. The received pulses, of the frequency shift type discussed hereinbefore, are amplified and limited at 28 to produce sharp, step-form rectangular pulses. In the bandpass filter 29 the mark and space pulses are separated by virtue of their different carrier frequencies, and the mark pulses are rectified at 31, and the space pulses are rectified at 32. Thus, at the output terminal 33 of the rectifier 31 appears the mark pulse wave form 13 of Fig. 3, it having been assumed that this transmission is subject to multipath phenomena and consequent pulse elongation. In similar manner at the output terminal 34 of the rectifier 32 appears the elongated space pulse wave form 14 of Fig. 3.

The mark pulses 13 are differentiated at 36 to produce the sharp spike wave form 37 shown in Fig. 3, and the space pulses are differentiated at 38 to produce the sharp spikes 39 of Fig. 3. The positive going portions of the pulses produce positive polarity spikes, while the negative going portions produce negative polarity spikes, in the well known fashion. Thus, the start of each mark pulse 13 produces a positive spike 41 (Fig. 3) while the finish of the pulse, shown at 18 in Fig. 3, produces a negative spike 42. A similar reaction occurs with respect to the space spikes as seen by comparing the wave form 39 and the wave form 14.

In the clipper-amplifier 43 the positive spikes 41 are amplified and the negative spikes 42 are completely eliminated, the resulting wave form appearing at 44 in Fig. 3. The space spikes are accorded similar treatment in the clipper-amplifier 46 to produce the spikes 47 shown in Fig. 3.

Numeral 48 designates any well known type of flip-flop circuit having two stable modes of operation and effective to remain in one mode of operation continuously until receiving a predetermined stimulation, which causes it to flip to the other mode of operation, where it remains until another predetermined stimulation—generally of different type, or applied to a different terminal—causes it to flip back to the first mentioned mode of operation. The operation of the flip-flop circuit 48 amounts to a re-creation of the original mark and space pulses 11 and 12 as transmitted, since the elongation of pulses is ignored by virtue of the fact that the flip-flop circuit is responsive only to start spikes 44 and 47 and not to the finish spikes 42 and 49. One mode of operation of the flip-flop circuit 48 represents mark pulses while the other mode represents space pulses.

A suitable output means of reproducer 51 serves to respond to the re-created mark and space pulses delivered from the circuit 48, and from the reproducer 51 a suitable de-coder 52 is operated.

Figure 1:
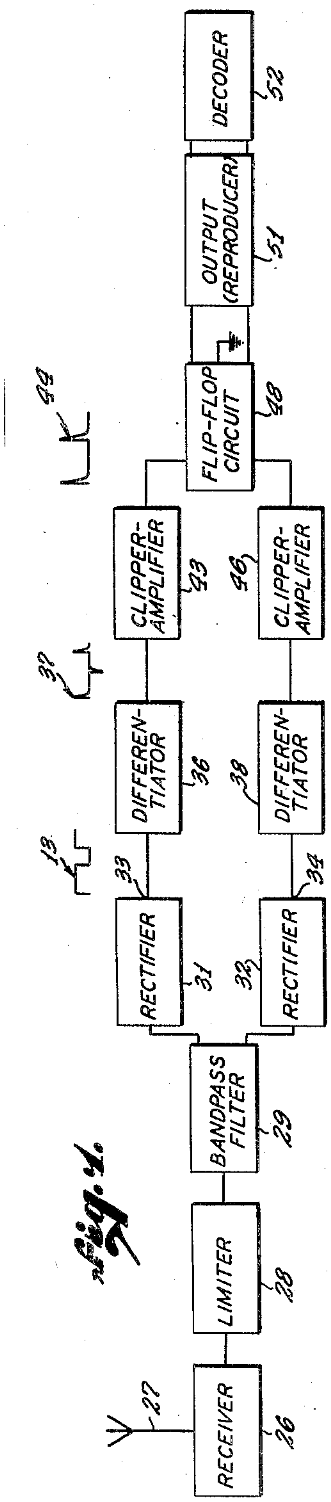
Fig. 1 is a block diagram illustrating the instant invention.
Figure 2:
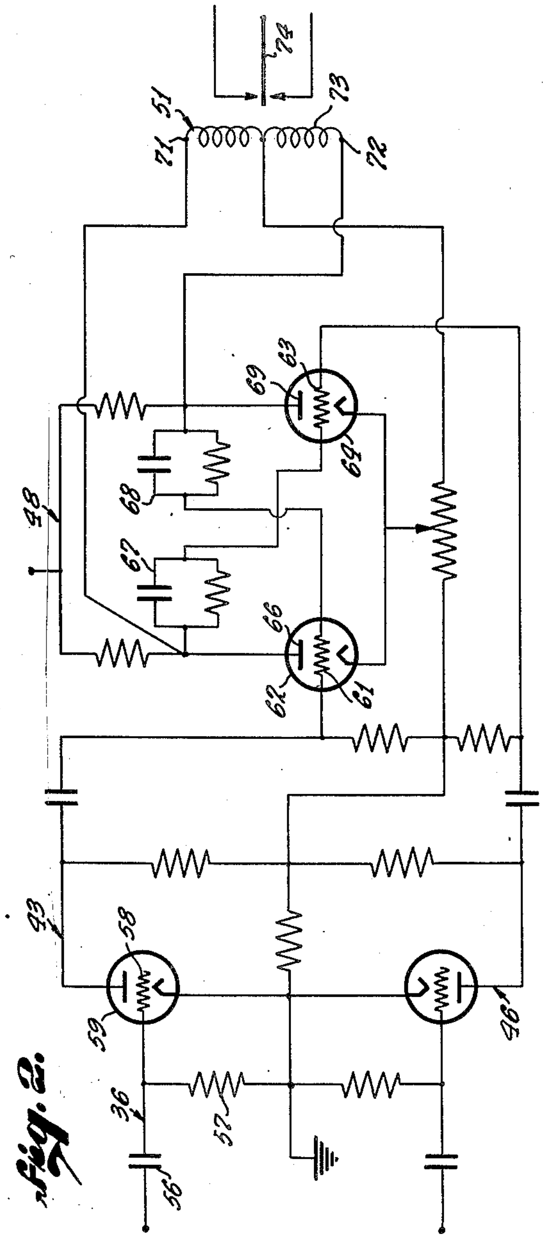
Fig. 2 is a circuit diagram showing a certain portion of the block diagram of Fig. 1 in circuit detail.

Fig. 2 shows in circuit detail the differentiators, clipper-amplifiers, and flip-flop circuits of Fig. 1. In Fig. 2 the differentiator 36 is shown consisting of a capacitor 56 and resistor 57 in series, having together a very short time constant compared to the pulses 11 and 12. The output of the differentiator 36 is applied to the grid 58 of an amplifying triode 59 constituting the principal component of the clipper-amplifier 43. The bias on the tube 59 is so fixed that the negative spikes 42 are not amplified, but are completely cut off, so that the output from the clipper 43 consists only of the amplified start spikes 44. These spikes are applied to the grid 61 of a tube 62, this grid constituting one input terminal of the flip-flop circuit 48.

The space pulses are treated in an exactly similar manner in the RC differentiator 38, and clipper-amplifier 46, the start spikes of the space pulses being applied to the grid 63 of a tube 64, which grid constitutes the other input terminal of the flip-flop circuit 48.

Together the two tubes 62 and 64 constitute the principal components of the flip-flop circuit 48, which is of well known construction, having two stable modes of operation; one mode being that where the tube 64 is conducting and the tube 62 is cut off completely; the other mode being the converse, where the tube 62 is conducting and the tube 64 is completely cut off. In well known manner the grid 63 of the tube 64 is cross-connected to the plate 66 of the tube 62 by a paralleled resistor-capacitor circuit 67. Similarly, the grid 61 of the tube 62 is cross-connected by the resistor-capacitor circuit 68 to the plate 69 of the tube 64.

If it be assumed that the tube 64 is conducting, then the voltage on the plate 69 will be down and the bias on the grid 61 will consequently be down by virtue of the coupling through the circuit 68. This mode of operation of the flip-flop circuit 48 represents the "space" condition thereof. Assume now that a mark start spike 44 is received on the grid 61. This tends to drive the tube 62 into slight conduction. This slight conduction places a negative going voltage on the plate 66 which is transmitted through the coupling circuit 67 to the grid 63. There is no external positive bias on the grid 63 to counteract the negative going voltage from the plate 66. This condition of the grid voltage tends to decrease the current in the tube 64 and consequently places a positive going voltage on the plate 69. This voltage, transmitted to the grid 61 through the circuit 68, fortifies the original mark start spike on the grid 61.

As is well known, this shift phenomenon is cumulative and very rapid, so that the flip-flop circuit 48 quickly shifts its mode of operation to the condition where the tube 62 is conducting and the tube 64 is cut off. This "mark" condition continues until a space pulse is received, whereupon a spike from the start of the space pulse is applied to the grid 63 to abruptly reverse the mode of operation of the flip-flop circuit 48 and cause it to flip back.

It will be readily seen that the flip-flop circuit 48 is utterly immune to the termination of the mark or space pulses 13 and 14, respectively, and is therefore not responsive in any way to pulse elongation through multipath phenomena.

The advantage of the differentiating circuits 36 and 38 may be readily appreciated by the following consideration of the Fig. 2 circuit. Assume that the undifferentiated pulse from the rectifier 31 is applied directly to the grid 61 instead of being differentiated at 36. When a space pulse subsequently appears on the grid 63, the tube 62 will be in conduction, and furthermore will have the continuing mark pulse still remaining on its grid 61. While it is possible that the flip-flop circuit 48 might flop over under this condition, the surety of change is decreased because the continuing mark pulse on the grid 61 has a tendency to keep the tube 62 in conduction and thus resist the mode changing impetus of the space pulse on the grid 63.

By differentiating the pulse at 36, the grid 61 is relieved of its positive signal, and the tube 62 continues to conduct although without a signal on its grid. The circuit 48 is thus more receptive to being shifted into that mode of operation where the tube 64 is brought into conduction.

The instant invention may be also practiced without the clipper-amplifiers 43 and 46, which eliminate the negative polarity spikes. Elimination of the negative polarity spikes is not essential, because such spikes would have no effect on the flip-flop circuit 48 anyway. For example, assume the circuit 48 to be in "space" condition, with the tube 64 conducting. This condition would be as shown immediately after the time point 21 of Fig. 3. Suppose now that the negative mark spike 42, resulting from termination of mark pulse 16, were allowed to come through instead of being clipped. This spike would be applied to the grid 61 of tube 62, which being already cut off, would be unaffected thereby. No change would occur in the operation of the circuit 48 until the next succeeding positive, mark start spike 41 was received on the grid 61.

The amplifiers 43 and 46, however, have the additional function of amplifying the spikes applied to the flip-flop circuit, and the further additional function of constituting a buffer stage to isolate the differentiating circuits 36 and 38, respectively, from the flip-flop circuit.

A typical use of the output of the flip-flop circuit 48 would be to connect the two plates 66 and 69 to the respective polar terminals 71 and 72 of a polar relay 73. Circuit 48 would thus cause the armature 74 to snap back and forth in response to its mode of operation. The relay 73 may in turn operate any suitable de-coder as shown in Fig. 1.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus.

What is claimed is:

1. A receiver for a mark-space, frequency shift, pulse transmission system subject to undesired elongation of pulses in transmission, comprising in combination: receiving means effective to receive and amplify alternate mark and space pulses, mark pulses being of a given carrier frequency and space pulses being of a slightly different carrier frequency, filter means connected to said receiving means and having two output terminals and being effective by frequency discrimination to separate mark pulses from space pulses and to apply mark pulses to one of its output terminals and space pulses to the other of its output terminals, a pair of rectifying means connected respectively to said output terminals of said filter means to detect the outputs from said filter means and thus create respectively mark pulses and space pulses, a pair of differentiating means connected respectively to said rectifying means to receive the mark pulses and space pulses, and effective to produce in response thereto sharp spikes at the start and finish of each pulse, start spikes being of one polarity and finish spikes being of opposite polarity, a pair of clipping means connected, respectively, to said pair of differentiating means to eliminate the finish spikes and deliver only start spikes, a flip-flop circuit having two stable modes of operation and a pair of input terminals, circuit means connecting one of said terminals to one of said clipping means and the other of said terminals to the other of said clipping means, and output means connected to said flip-flop circuit to produce marks and spaces therefrom.

2. A receiver for a mark-space, frequency shift, pulse transmission system subject to undesired elongation of pulses in transmission, comprising in combination: receiving means effective to receive and amplify alternate mark and space pulses, mark pulses being of a given carrier frequency and space pulses being of a slightly different carrier frequency, filter means connected to said receiving means and having two output terminals and being effective by frequency discrimination to separate mark pulses from space pulses and to apply mark pulses to one of its output terminals and space pulses to the other of its output terminals, a pair of rectifying means connected respectively to said output terminals of said filter means to detect the outputs from said filter means and thus create respectively mark pulses and space pulses, a pair of differentiating means connected respectively to said rectifying means to receive the mark pulses and space pulses, and effective to produce in response thereto sharp spikes at the start and finish of each pulse, the spikes at the start being of one polarity and those at the finish being of opposite polarity, clipping means connected to eliminate the finish spikes and deliver only start spikes, a flip-flop circuit having two stable modes of operation and a pair of input terminals, circuit means connecting said terminals, respectively, one to receive start spikes from the mark pulses, the other to receive start spikes from the space pulses, and output means connected to said flip-flop circuit to produce marks and spaces therefrom.

3. A receiver for a mark-space, frequency shift, pulse transmission system subject to undesired elongation of pulses in transmission, comprising receiving means effective to receive and amplify alternate mark and space pulses, mark pulses being of one distinctive characteristic, and space pulses being of another distinctive characteristic, separating means connected to the output of said receiving means and having a pair of output terminals, and effective to separate mark pulses from space pulses by virtue of said characteristics, and to apply mark pulses to one of its output terminals and space pulses to the other of its output terminals, a pair of differentiating means effective to receive mark pulses and space pulses, and effective to produce in response thereto sharp spikes at the start and finish of each pulse, circuit means connecting the outputs of said separating means to the respective said differentiating means, a flip-flop circuit having two stable modes of operation and a pair of input terminals, circuit means connecting said terminals, respectively, one to receive start spikes from the mark pulses, the other to receive start spikes from the space pulses, and output means connected to said flip-flop circuit to produce marks and spaces therefrom.

4. A receiver for a mark-space, frequency shift, pulse transmission system subject to undesired elongation of pulses in transmission, comprising receiving means effective to receive and amplify alternate mark and space pulses, mark pulses being of one distinctive characteristic, and space pulses being of another distinctive characteristic, separating means connected to the output of said receiving means and having a pair of output terminals, and effective to separate mark pulses from space pulses by virtue of said characteristics, and to apply mark pulses to one of its output terminals and space pulses to the other of its output terminals, a pair of differentiating means effective to receive mark pulses and space pulses, and effective to produce in response thereto sharp spikes at the start and finish of each pulse, circuit means connecting the outputs of said separating means to the respective said differentiating means, a flip-flop circuit having two stable modes of operation, circuit means connecting said flip-flop circuit to said differentiating means to receive said spikes and effective to abruptly shift the mode of operation of said flip-flop circuit in response to alternate mark and space start spikes, and output means connected to said flip-flop circuit to produce marks and spaces therefrom.

5. A receiver for a mark-space pulse transmission system subject to undesired elongation of pulses in transmission, comprising receiving means effective to receive alternate mark and space pulses, mark pulses being of one distinctive characteristic, and space pulses being of another distinctive characteristic, separating means connected to the output of said receiving means and having a pair of output terminals, and effective to separate mark pulses from space pulses by virtue of said characteristics, and to apply mark pulses to one of its output terminals and space pulses to the other of its output terminals, spike producing means effective to receive mark pulses and space pulses, and effective to produce spikes in response thereto at least at the start of each pulse, circuit means connecting the outputs of said separating means to said spike producing means, a flip-flop circuit having two stable modes of operation, circuit means connecting the input of said flip-flop circuit to the output of said spike producing means to receive said spikes and effective to abruptly shift the mode of operation of said flip-flop circuit in response to alternate mark and space start spikes, and output means connected to said flip-flop circuit to produce marks and spaces therefrom.

6. A receiver for a mark-space pulse transmission system subject to undesired elongation of pulses in transmission, comprising receiving means effective to receive alternate mark and space pulses, mark pulses being of one distinctive characteristic, and space pulses being of another distinctive characteristic, separating means connected to the output of said receiving means and having a pair of output terminals, and effective to separate mark pulses from space pulses by virtue of said characteristics, and to apply mark pulses to one of its output terminals and space pulses to the other of its output terminals, spike producing, resistor-capacitor differentiating means effective to receive mark pulses and space pulses, and effective to produce spikes in response thereto at least at the start of each pulse, circuit means connecting the outputs of said separating means to said spike producing means, a flip-flop circuit having two stable modes of operation, circuit means connecting the input of said flip-flop circuit to the output of said spike producing means to receive said spikes and effective to abruptly shift the mode of operation of said flip-flop circuit in response to alternate mark and space start spikes, and output means connected to said flip-flop circuit to produce marks and spaces therefrom.

LEWIS C. FETEN.

References Cited in the file of this patent

UNITED STATES PATENTS

| Number | Name | Date |
|---|---|---|
| 2,086,918 | Luck | July 13, 1937 |
| 2,113,214 | Luck | Apr. 5, 1938 |
| 2,510,139 | Purington | June 6, 1950 |
| 2,539,797 | Smith | Jan. 30, 1951 |

FOREIGN PATENTS

| Number | Country | Date |
|---|---|---|
| 516,099 | Germany | June 17, 1931 |